United States Patent

[11] 3,613,669

[72] Inventors Thomas H. Corbin;
Martin E. Kienitz, both of Palo Alto, Calif.
[21] Appl. No. 796,732
[22] Filed Feb. 5, 1969
[45] Patented Oct. 19, 1971
[73] Assignee Smith Kline Instruments, Inc.
Palo Alto, Calif.

[54] SYSTEM AND METHOD EMPLOYING VIDEO EQUIPMENT FOR REMOTE MONITORING OF BODY FUNCTION ACTIVITIES
12 Claims, 1 Drawing Fig.

[52] U.S. Cl. ................................................. 128/2.06 R, 128/2.1 A
[51] Int. Cl. ............................................... A61b 5/04
[50] Field of Search ............................................ 128/2.05, 2.06, 2.15, 2.1

[56] References Cited
UNITED STATES PATENTS
3,156,235 11/1964 Jaeger............................ 128/2.05
3,199,508 8/1965 Roth.............................. 128/2.06
3,339,543 9/1967 Richard......................... 128/2.06
3,442,264 5/1969 Levitt............................ 128/2.06
FOREIGN PATENTS
943,489 5/1956 Germany....................... 128/2.06

Primary Examiner—William E. Kamm
Attorney—Fleur, Hohbach, Test, Albritton & Herbert ABSTRACT: A plurality of body function activities such as cardiac conditions are monitored from a single remote station and electric signal representations of each activity so monitored are stored temporarily in an associated storage register such as a given related trace appearing in a visual display of several such traces. Scanning means, such as a television or vidicon camera scans the visual display of such signals and transmits them all to each of a number of additional viewing stations assigned to various locations remote from the scanning apparatus. At each scanning location, a portion of the visual display can be eliminated whereby only a given pertinent portion is displayed at that station.

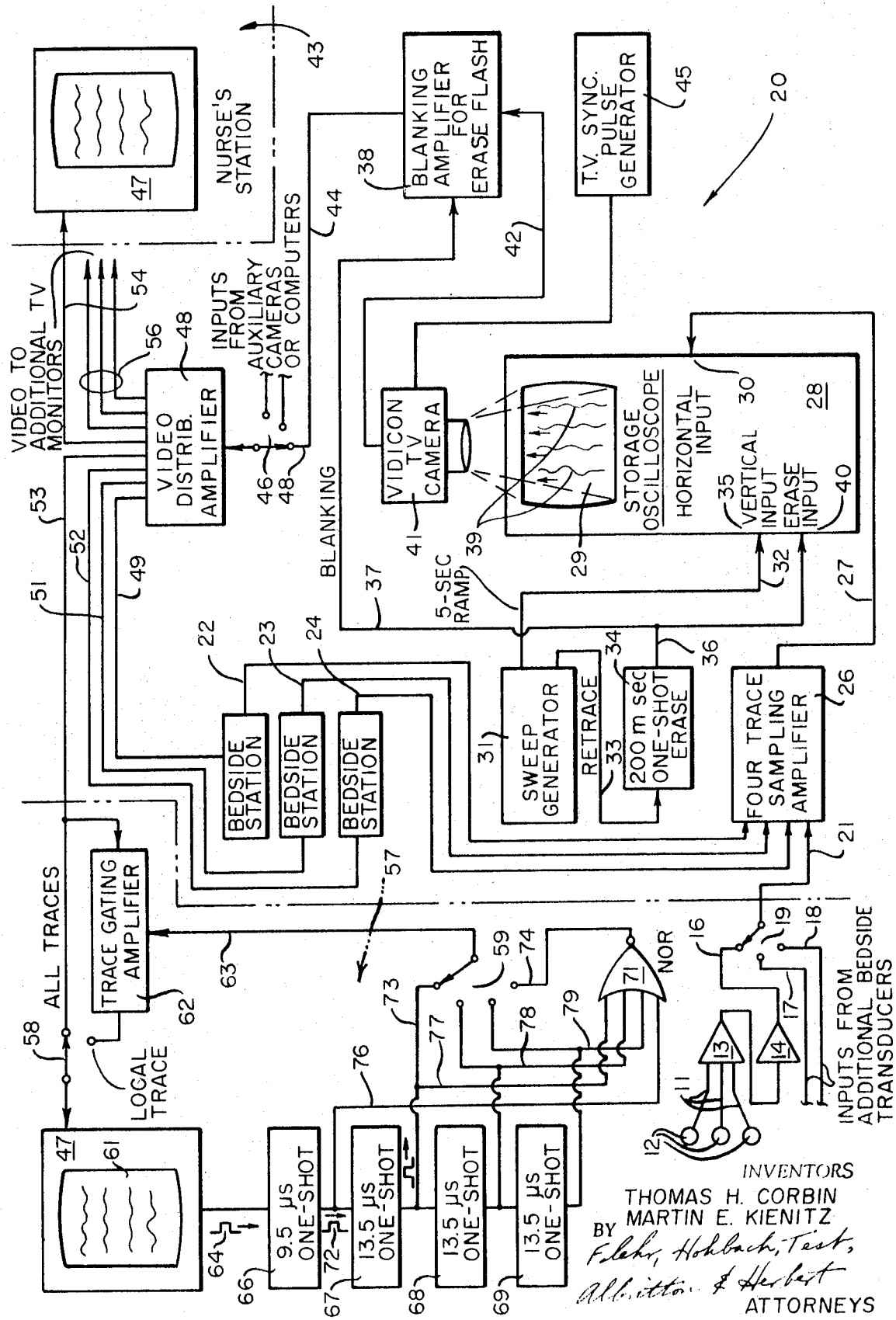

SYSTEM AND METHOD EMPLOYING VIDEO EQUIPMENT FOR REMOTE MONITORING OF BODY FUNCTION ACTIVITIES

BACKGROUND OF THE INVENTION

This invention pertains to a system and method for remote monitoring of body function activities and is particularly useful in the remote monitoring of such body function activities as cardiac conditions of patients confined to various rooms in a hospital.

Heretofore, it has been difficult and expensive to maintain constant vigilance in keeping certain critical body function activities of patients under proper surveillance.

SUMMARY OF THE INVENTION AND OBJECTS

In general, the present invention provides a system and method for monitoring body function activities comprising means for transducing manifestations of the body function activity to be monitored. The transducing of these manifestatons provides electric signals representative of each of the individual monitored activites. A transient storage means simultaneously receives and stores the signals respectively in individual active storage registers for a predetermined period of time sufficient to permit the body function activity to be properly monitored and evaluated. Scanning means disposed remote from display means located in each of the patient's rooms serves to read out the respective storage registers into the display means.

In general, it is an object of the invention to provide an improved monitoring system and method for maintaining proper surveillance of body function activities.

BRIEF DESCRIPTION OF THE DRAWING

The single FIGURE of the drawing shows a schematic diagram of a system according to the invention herein.

DESCRIPTION OF THE PREFERRED EMBODIMENT

Means for transducing manifestations of a given body function activity, such as cardiac conditions in a number of patients located variously in a hospital, are provided which serve to provide electric signals representative of the cardiac activity for each patient individually.

Thus, cardiac electric signals are picked up and amplified in known manner using conventional ECG. electrodes which are fastened to the patient. These signals appear on cardiac input leads 11 operably coupled to suitable ECG. transducer means schematically indicated by the small circles 12. Cardiac input leads 11 feed directly to a high-gain amplifier 13 having a voltage gain, for example, of approximately 1,000. The signal from the patient is then further amplified (or attenuated) by an automatic gain control amplifier 14 so that the peak to peak excursion of the signal voltage is held between predetermined bounds, for example, on the order of plus or minus 1 volt. The output from amplifier 14 thus appears on line 16.

It is to be understood that additional body function activities may provide signals via lines 17, 18 from the same patient for monitoring them if desired, in the same fashion as explained below. Thus, a switch 19 provides a selective connection to the appropriate body function activity transducer to be monitored in the manner hereinafter described.

The output from switch 19 is fed via an input line 21 to a remote processing station 20 as now to be described. However, it is to be further understood that additional inputs from lines 22, 23 and 24 are also fed to the same remote processing station 20 in similar fashion. As shown, up to four signals, from four different patient locations (or from four different body function transducers of the same patient), are fed to the processing station 20. At that point, the four signals are sampled sequentially with a high-speed chopping four-channel sampling amplifier 26 of known construction and of a type whereby the chopped sampling amplifier output on line 27 provides a sequence of pulses operably coupled to drive the horizontal deflection plates of a conventional storage type oscilloscope 28.

The storage oscilloscope 28 is preferably of a type wherein a fine-mesh storage screen is located within the oscilloscope tube adjacent the phosphor screen and electron guns are arranged so as to write on the mesh storage screen. The visual image on the phosphor screen is produced by low-velocity electrons flooding through the storage mesh. The phosphor image remains visible for a period sufficient to accommodate visual evaluation of the signal traces recorded thereon. It may be erased by changing of the voltage on the screen in conjunction with the application of a general flooding of the end of the tube with a high-voltage charge.

The storage oscilloscope, being of conventional construction, includes a viewing screen 29 wherein the width of the screen 29 exceeds the height of the screen.

By coupling the output of sampling amplifier 26 via line 27 to the horizontal input 30 of the oscilloscope 28, the horizontal deflection plates will be controlled in response to the amplitude of signals appearing on line 27 and, hence, amplitude of traces 39 appearing on viewing screen 29 will be measured by the lateral excursions of the electron traces. Accordingly, it becomes advantageous to make the connections as recited herein so as to gain the additional space provided by the elongated conventional width of screen 29 so as to avoid any need to reconstruct the storage oscilloscope.

The vertical deflection plates of storage oscilloscope 28 are driven by a sweep generator 31 of conventional construction of a type which slowly moves the chopped four-channel display from the bottom to the top of screen 29 in a predetermined period such as 5, 10 or 15 seconds as desired. For example, a 5-second ramp function is generated on input lead 32 directly coupled to the vertical deflection plate input connections 35 of storage oscilloscope 28.

At the end of each sweep, the display on screen 29 quickly retraces to the bottom of the screen, the storage tube is promptly erased, and the process begins again. In order to accomplish the foregoing steps, a second output from sweep generator 31 appears on line 33 whereby a retrace pulse appears at the end of each successive predetermined time interval, such as the 5-second ramp function generated on line 32. Thus, the retrace pulse on line 33 is fed to a conventional one-shot multivibrator circuit 34 of a type serving to provide an output signal of predetermined duration such as 200 milliseconds.

The retrace pulse of line 33 activates circuit 34 whereby its output appears at lead 36 for direct coupling to the erase input 40 conventionally found on storage oscilloscopes of the type such as storage oscilloscope 28. The duration of the output pulse on lead 36 is determined by circuit 34 whereby, for example, the 200-millisecond pulse effects erasing.

The erase pulse generated on lead 36 is also fed via line 37 to a blanking amplifier 38 for purposes as explained further below.

Thus, in the foregoing manner, the cardiac information or other body function information as may be detected by transducing manifestations of such conditions will be available on the face of screen 29. The transduced manifestations will each present to the transient storage means independent discrete traces 39 on the face of screen 29. Accordingly, each such trace 39 constitutes an individual active transient storage register for a time sufficient to permit the body function activity to be properly monitored.

Scanning means now to be described serve to read out each of these storage registers to various display means for presenting each of the traces simultaneously for the same period of time.

Thus, it will be readily evident that the display on screen 29 of the four traces constituting four individual active transient storage registers are oriented in a manner whereby the traces are disposed 90° from their usual manner of presentation. Thus, the signal amplitudes are displayed along the horizontal axis of screen 29 and elapsed time is measured along the vertical axis.

In addition, the traces remain temporarily stored and continuously displayed as they are recorded on the tube face by its scanning electron beam. All traces persist at full brightness, without appreciable decay, until they reach the top edge of the tube face, whereupon they are all erased and the traces are continued commencing anew at the bottom edge of screen 29. The elapsed time required for a trace to move from the bottom to the top of screen 29 will depends upon the cycle of sweep generator 31. In a customary circumstance, this period will run on the order of a 5-second period of information displayed on screen 29 simultaneously from each of four patients (or from four different body function monitors attached to the same patient). The period of time selected for this purpose should correspond to an appropriate period sufficient to permit the body function activity to be properly monitored by a qualified viewer visually evaluating the traces.

Traces 39 as recorded are considered as having been stored upon the viewing screen 29 of oscilloscope 28 inasmuch as the traces are displayed on screen 29 for a predetermined period as mentioned above to permit proper monitoring thereof by visual inspection and these same traces are maintained in a visible state for the duration of that same period. Thus, the beginning of the trace is maintained on the face of screen 29 in a visible state even as the end of the same trace is being recorded upon screen 29 at the upper edge of screen 29. Accordingly, the entire length of the trace is visible without noticeable decay in any particular portion thereof throughout an appropriate period.

Scanning means have been provided which serve to read out each of the storage registers (represented by traces 39). The body function activity information available on the face of storage screen 29 is relayed to remote locations by means of a closed circuit television system as now to be described.

A vidicon-type television camera 41 of conventional construction is positioned to scan the entire field of screen 29 and to transmit portions thereof to each of a number of remotely located display monitors 47 located, for example in each room of those patients under surveillance and also at a nurse's master monitoring station 43. The conventional TV synchronizing pulse generator 45 is shown for synchronizing the scanning action of camera 41.

Accordingly, a composite synchronizing and video output signal on line 42 from camera 41 is fed to a blanking amplifier 38 which serves to blank the video portion of the signal during the erase cycle of storage scope 28.

It will be recalled that a 200-millisecond one-shot circuit 34 provides a prolonged pulse or signal on line 36 coupled to erase input 40 of storage oscilloscope 28 and that the same prolonged pulse is simultaneously applied as a blanking control pulse to the blanking amplifier 38. Thus, during erasure of storage oscilloscope 28, the screen 29 is momentarily flooded with a charge which causes the tube face to flash brightly for a short moment. Since it is desired not to present these repetitive flashing tube conditions to the patient's monitors, the action of the blanking input to amplifier 38 serves momentarily to block or interrupt transmission of the video portion of the signal derived from the scanning of screen 29 by camera 41.

The remainder of the composite video signal is, however, transmitted via line 44 and selector switch 46 to five or more conventional closed circuit television monitors 47 each of which provides a television display of traces 39.

If desired, selector switch 46 may be, at appropriate times, manually coupled to provide signals to monitors 47 from other sources such as from auxiliary cameras at other locations, or to provide display signals from a computer or other information source, as might be provided by supplying other information for distribution to the patients or to the nurse's station.

Each TV monitor 47 is mounted on its side at 90° to the conventional manner. Thus, the TV raster lines are oriented in a vertical direction rather than in the more usual horizontal direction. The four traces 39 viewed by camera 41 are thus presented in a conventional orientation for viewing by the patient or nurse, whereby the signal amplitudes extend along the vertical direction and elapsed time is again conventionally represented by movement of the traces from left to right along the horizontal.

Transmission to the patient's monitor 47 and to the nurse's station 43 is handled from line 44, a selector switch 46 (in its closed position with respect to line 44) and a video distributor amplifier 48 of conventional construction such as of a type for simultaneously feeding a single signal input to a number of stations as, for example, via lines 49, 51–54 and 56 as disclosed further below.

Thus, the composite video output signal (minus the erase flash on screen 29) is fed simultaneously to a number of monitors 47.

Means are provided whereby all patients' traces 39 may be displayed at the remote monitors 47 associated with each patient's bedside if desired. For simplicity in explanation, a single bedside station 57 is shown in the drawing coupled to line 53 and it is to be understood that a number of additional similar bedside stations are to be coupled respectively to the lines 49, 51 and 52 in the same manner as now to be described with respect to bedside station 57.

Means for displaying all traces 39 includes the selector switch 58 in line 53 which serves to supply the composite video signal of line 44 to the conventional input connection for TV monitor 47.

Inasmuch as there will normally only be interest at the patient's station in his own trace, means have further been provided for selectively displaying only one of the traces 39 on monitor 47 at the patient's bedside.

Briefly, the bedside selector switch 59 normally will be set to provide a signal trace display on the TV monitor screen 61 located in the patient's presence. However, to permit a nurse or doctor when making their rounds to keep in touch with the conditions of other patients, the other selector switch 58 may be used to bypass switch 59 whereby all traces will be displayed on screen 61.

Means for selecting any given one of the traces for display by a patient includes a trace gating amplifier 62 disposed to be coupled by switch 58 into the line 53 supplying signals to monitor 47. Gating amplifier 62 is of known construction arbitrarily arranged to be responsive to control or gating pulses of a positive state (referred to hereinafter as "ones") appearing on a control input line 63 and in response thereto serves to gate or pass video signals on line 53 through to the monitor 47. The synchronizing portions of the composite signal from line 44 are unaffected by gating amplifier 62 so as not to be interrupted.

A series of four one-shot multivibrators of conventional construction respond sequentially to the usual horizontal synchronizing pulse 64 taken from monitor 47. Pulse 63 is of conventional style and, for example, can exist for a period on the order of 65 microseconds. Thus, pulse 64 serves to sequentially generate short output pulses from the succession of one-shot multivibrators 66–69 to provide the gating control signals for amplifier 62. These short output pulses from multivibrators 66–69, in conjunction with a NOR-gate 71, provide a sequence of four positive state pulses or "ones" as inputs on line 63 to operate gating amplifier 62 in timed relation with respect to any selected trace 39 to be displayed.

Thus, the leading edge of the synchronizing pulse 64 from display monitor 47 at the patient's bedside initiates operation of the first one-shot multivibrator 66. Multivibrators 66–69 are arranged in known fashion whereby the trailing edge of the output pulse 72 from one multivibrator 66 initiates operation of the next one-shot multivibrator 67 whereby the "one" output (or positive state signal) on lines 73, 63 (when connected via selector switch 59) serves to gate a trace signal to monitor 47 as carried on line 53.

Similarly, successive one-shot multivibrators 68, 69 can each provide a "one" pulse directly via selector switch 59 to line 63 for gating a related one of the traces 39 to monitor 47 merely by operating switch 59.

The fourth gating pulse for line 63 is derived when switch 59 is conditioned to connect to line 74 leading from NOR-gate 71. NOR-gate 71 is arbitrarily of known type whereby when any one or more inputs are "ones," the output (on line 74) is "zero," i.e. a positive input signal produces a "zero" output signal. Also, when all inputs are "zero," the output is a "one." A "zero" output is designated herein arbitrarily as representing a "no voltage" condition.

Thus, after all one-shots 66–69 have fired, there will be a conjoint occurrence of "zeros" at NOR gate 71 to provide a gating control signal or "one" on line 63 for the time remaining before the next synchronizing pulse fires one-shot 66 whereupon a positive signal or "one" will be sensed by NOR-gate 71 reversing its output on lines 74, 63 to "zero."

One-shot 66, when fired, provides the time delay required to permit the retrace function of screen 61 to occur.

As thus arranged, a time delay is built into the system at no increase in cost whereby the retrace period required by each bedside monitor 47 may be provided during the period of operation of one-shot multivibrator 66. Thus, signals will not be gated through to the TV monitor screen 61 during the retrace period.

From the foregoing, it will be readily evident that an improved monitoring system has been provided wherein a number of body function activities can be monitored simultaneously by a nurse either at her main station or during the course of making the rounds of the various patients being kept under surveillance. In addition, at each patient's station, a selector switch can be operated to monitor that patient's own body function activity under surveillance.

Inasmuch as a storage oscilloscope of the type shown at 28 herein may be presently relatively expensive, the present system serves to minimize the undue expense of providing a relatively large number of expensive monitoring arrangements for many patients. Notwithstanding the face that the storage oscilloscope 28 of conventional type as utilized herein may represent a sizeable expense at the present time, the system itself serves to significantly minimize the per capita expense where many patients or body function activities of a single patient are required to be monitored simultaneously.

From the foregoing it will be readily apparent that the above-described invention for monitoring a plurality of body function activities comprises the steps of detecting and converting manifestations of the body function activities so monitored into electric signal traces representative of each activity. At the same time, the signals so generated are visibly displayed for a predetermined period of time adequate to permit that particular body function activity to be monitored and evaluated by visual inspection thereof.

In addition, those signals displayed during the above period are maintained in a visible state for the full duration of such period. During the display of these signals, they are scanned and transmitted to a remote station wherein they are converted to a visual representation thereof for display at such remote station. Subsequently, the invention contemplates the erasing of all of the above signals displayed during the display period followed by recommencement of further display of the body function activity manifestations whereby the display represents a continuous presentation of such body function activities.

From the foregoing description it will be apparent that the information received in the storage means 28 is not only stored to retain a record of immediately preceding cardiac activity but is also being stored simultaneous with its occurrence, and thus constitutes real time information. In addition, it will be apparent that upon receipt of the real time information at the storage means 28, that same real time information is being simultaneously displayed on the monitors 47 along with the immediately preceding stored information. Even though a bit of information is stored immediately upon its receipt in the means 28, it is, nevertheless, at that instant, real time information and is available as real time information at the monitors 47 even though an instant later it becomes stored information and new real time information is being received.

We claim:

1. A system for monitoring cardiac activity in patients confined at individual stations comprising means adapted to be associated with each patient for transducing manifestations of cardiac activity and to provide electric signal information representative of said activity for each patient, transient storage means for receiving and storing said signal information separately for each patient, means for reading out of said transient storage means said signal information for each of said patients while it is being received whereby to derive signals which include the stored information and the real time information, an output display for receiving and displaying said signals at each patient's station and at a common monitoring station, and means serving to couple the readout means to transmit said signals to each of said stations whereby to display the stored and real time information simultaneously.

2. A system for monitoring cardiac activity of patients according to claim 1 wherein said storage means includes a visual display of said signals.

3. A system for monitoring body function activity of patients confined at individual stations comprising means adapted to be operably coupled to a patient for transducing manifestations of said activity and to provide electric signals representative of said activity for each patient, transient storage means, including a visual display of said signals, for receiving and displaying signal traces separately for each of said patients, display monitors disposed at said stations, and means for scanning the first named said visual display and for transmitting at least portions thereof to each of said display monitors.

4. A system for monitoring body function activity of patients according to claim 3 wherein said visual display includes means forming a single visual display area common to a plurality of said signals.

5. A system for monitoring body function activities comprising means for transducing manifestations of said activities to provide electric signals representative of each said activity individually, transient storage means for simultaneously receiving and storing said signals respectively in individual active registers for a predetermined period of time sufficient to permit said body function activity to be monitored, means for reading out said registers while said electric signals are being received and stored to provide output signals which include stored and real time signals representative of said activity, display means for receiving said output signals and separately presenting said signals for said predetermined period of time and means serving to erase said storage registers.

6. A system for monitoring body function activities according to claim 5 wherein said means for erasing said storage registers serves conjointly to interrupt the output from said readout means.

7. A system for monitoring body function activities according to claim 5 wherein said storage means includes a storage oscilloscope screen of a type for retaining thereon in a visible state for the duration of said period those signals displayed during said period, said registers comprising separate signal traces derived from each said activity monitored, and wherein said erasing means serves to provide an erasing signal to said oscilloscope for a period sufficient to erase same while conjointly interrupting the output of said read-out means whereby transmission to said display means during the erasing interval will be discontinued.

8. A system for monitoring body function activities according to claim 5 further including means at each said display means coupled to operate an associated one of said display means for each patient and serving to restrict the display of said signals to those of a single one of said registers.

9. The method of monitoring a plurality of body function activities comprising the steps of detecting and converting manifestations of said activities into electric signal traces representative of each said activity, visibly displaying said signals for a predetermined period adapted to permit said body function activity to be monitored by visual inspection, maintaining in a visible state for the duration of said period those signals displayed during said period, scanning the displayed signals and transmitting same to a remote station, converting said transmitted signals to a visual representation thereof, and then erasing said signals displayed during said period and recommencing further display of said body function activity manifestations.

10. A system for monitoring one or more body function activities of one or more patients confined at individual locations comprising means for transducing manifestations of said activity for each patient to provide electrical signals representative of said activity; transient storage means for receiving and separately storing the signals corresponding to said one or more activities for said one or more patients, means for reading out of said transient storage means said electrical signals as they are being received and stored whereby to derive output signals which include stored and real time information, and display means for receiving said output signals and forming a visual display of said output signals whereby said display includes a simultaneous display of stored and real time information.

11. A system as in claim 10 including means for selectively applying said signals to said display means whereby signals corresponding to one or more of said manifestations of activity are displayed.

12. The method of monitoring a plurality of body function activities comprising the steps of detecting and converting manifestations of said activities into electrical signals representative of each of said activities, temporarily storing said signals in a signal storage means for a predetermined period of time, reading said signals from said storage means while they are being stored to form an output signal including stored signals and real time signals and converting said output signal to a visual representation which presents a simultaneous display of stored information and real time information of the body function activity.